United States Patent
Komori et al.

(10) Patent No.: US 8,216,741 B2
(45) Date of Patent: *Jul. 10, 2012

(54) METHOD FOR GENERATING AN ELECTRIC POWER WITH USE OF A FUEL CELL AND A FUEL CELL

(75) Inventors: Tomoyuki Komori, Osaka (JP); Takashi Otsuka, Osaka (JP); Atsushi Omote, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/219,303

(22) Filed: Aug. 26, 2011

(65) Prior Publication Data

US 2012/0052409 A1    Mar. 1, 2012

Related U.S. Application Data

(63) Continuation of application No. PCT/JP2010/006866, filed on Nov. 25, 2010.

(30) Foreign Application Priority Data

Jan. 27, 2010   (JP) ................................ 2010-014975

(51) Int. Cl.
    *H01M 8/08* (2006.01)
(52) U.S. Cl. ......... 429/498; 429/499; 429/500; 429/501
(58) Field of Classification Search .................. None
    See application file for complete search history.

(56) References Cited

U.S. PATENT DOCUMENTS

2005/0221143 A1 * 10/2005 Kwon et al. .................... 429/33

FOREIGN PATENT DOCUMENTS

| JP | 01-257129 | * 10/1989 |
| JP | 2002-080214 | 3/2002 |
| JP | 2003-331869 | 11/2003 |
| JP | 2005-158646 | 6/2005 |
| JP | 2005-294245 | 10/2005 |
| JP | 2007-273286 | 10/2007 |
| WO | WO 2006/085446 A1 | 8/2006 |
| WO | WO 2010/131301 A1 | 11/2010 |

* cited by examiner

*Primary Examiner* — Barbara Gilliam
*Assistant Examiner* — Adam A Arciero
(74) *Attorney, Agent, or Firm* — McDermott Will & Emery LLP (57) ABSTRACT

A fuel cell capable of operating under a high temperature environment and under a low humidity environment and a method for generating an electric power with use of the fuel cell. The fuel cell comprises an electrolyte membrane, an anode electrode, and an cathode electrode. In each of the anode electrode and the cathode electrode, a catalyst is held on a catalyst support, and an electrolyte covers the catalyst and the catalyst support. The cathode electrolyte is composed of $SnO_2$, $NH_3$, $H_2O$, and $H_3PO_4$. A molar ratio X represented by $X=NH_3/SnO_2$ is not less than 0.2 and not more than 5, and a molar ratio Y represented by $Y=P/Sn$ is not less than 1.6 and not more than 3.

8 Claims, 12 Drawing Sheets

METHOD FOR GENERATING AN ELECTRIC POWER WITH USE OF A FUEL CELL AND A FUEL CELL

This application is a continuation of International Application No. PCT/JP2010/006866, whose international filing date is Nov. 25, 2010 which in turn claims the benefit of Japanese Patent Application No. 2010-014975, filed on Jan. 27, 2010, the disclosures of which Applications are incorporated by reference herein. The benefit of the filing and priority dates of the International and Japanese Applications is respectfully requested.

TECHNICAL FIELD

The present disclosure relates to a method for generating an electric power with use of a fuel cell capable of operating under a high temperature and low humidity environment. The present disclosure relates to a fuel cell capable of operating under a high temperature and low humidity environment.

The purpose of the present disclosure is to provide a fuel cell capable of operating under a high temperature and low humidity environment and a method for generating an electric power with use of the fuel cell.

SUMMARY

The present disclosure relates to a method for generating an electric power with use of a fuel cell. The method comprises (a) preparing a fuel cell. The fuel cell comprises an electrolyte membrane; an anode electrode comprising an anode catalyst, an anode catalyst support, and an anode electrolyte; and an cathode electrode comprising an cathode catalyst, a cathode catalyst support, a cathode electrolyte. The electrolyte membrane is interposed between the anode electrode and the cathode electrode. The anode catalyst is held on the anode catalyst support, and the anode electrolyte covers the anode catalyst and the anode catalyst support. The cathode catalyst is held on the cathode catalyst support, and the cathode electrolyte covers the cathode catalyst and the cathode catalyst support. The cathode electrolyte is composed of $SnO_2$, $NH_3$, $H_2O$, and $H_3PO_4$. A molar ratio X represented by $X=NH_3/SnO_2$ is not less than 0.2 and not more than 5, and a molar ratio Y represented by $Y=P/Sn$ is not less than 1.6 and not more than 3. The step (a) of the method is followed by (b) supplying hydrogen to the anode electrode and supplying oxygen having relative humidity of not less than 0% and not more than 40% to the cathode electrode while the fuel cell is maintained at a temperature of not less than 0 degrees Celsius and not more than 200 degrees Celsius so as to generate a potential difference between the anode electrode and the cathode electrode.

In the step (b), it is preferred that the fuel cell is maintained at a temperature of not less than 65 degrees Celsius, preferably, In the step (b), it is preferred that the fuel cell is maintained at a temperature of more than 100 degrees Celsius.

In the step (b), it is preferred that the fuel cell is maintained at a temperature of not more than 120 degrees Celsius.

In the step (b), it is preferred that the fuel cell is maintained at a temperature of not less than 65 degrees Celsius and not more than 200 degrees Celsius.

In the step (b), it is preferred that the fuel cell is maintained at a temperature of not less than 65 degrees Celsius and not more than 150 degrees Celsius.

In the step (b), it is preferred that the fuel cell is maintained at a temperature of not less than 65 degrees Celsius and not more than 120 degrees Celsius.

The present disclosure relates to a fuel cell used for the above-mentioned electric power generation method. Namely, the fuel cell comprises an electrolyte membrane; an anode electrode comprising an anode catalyst, an anode catalyst support, and an anode electrolyte; and an cathode electrode comprising an cathode catalyst, an cathode catalyst support, an cathode electrolyte. The electrolyte membrane is interposed between the anode electrode and the cathode electrode. The anode catalyst is held on the anode catalyst support, and the anode electrolyte covers the anode catalyst and the anode catalyst support. The cathode catalyst is held on the cathode catalyst support, and the cathode electrolyte covers the cathode catalyst and the cathode catalyst support. The cathode electrolyte is composed of $SnO_2$, $NH_3$, $H_2O$, and $H_3PO_4$. A molar ratio X represented by $X=NH_3/SnO_2$ is not less than 0.2 and not more than 5, and a molar ratio Y represented by $Y=P/Sn$ is not less than 1.6 and not more than 3.

The above-mentioned purpose, another purpose, the feature and the advantage of the present disclosure are clarified by the detailed description of the following preferred embodiment with reference to the drawings.

The fuel cell of the present disclosure is capable of operating under a high temperature and low humidity environment.

DESCRIPTION OF EMBODIMENTS

The embodiment of the present disclosure is described below with reference to the drawings.

Figure 1:
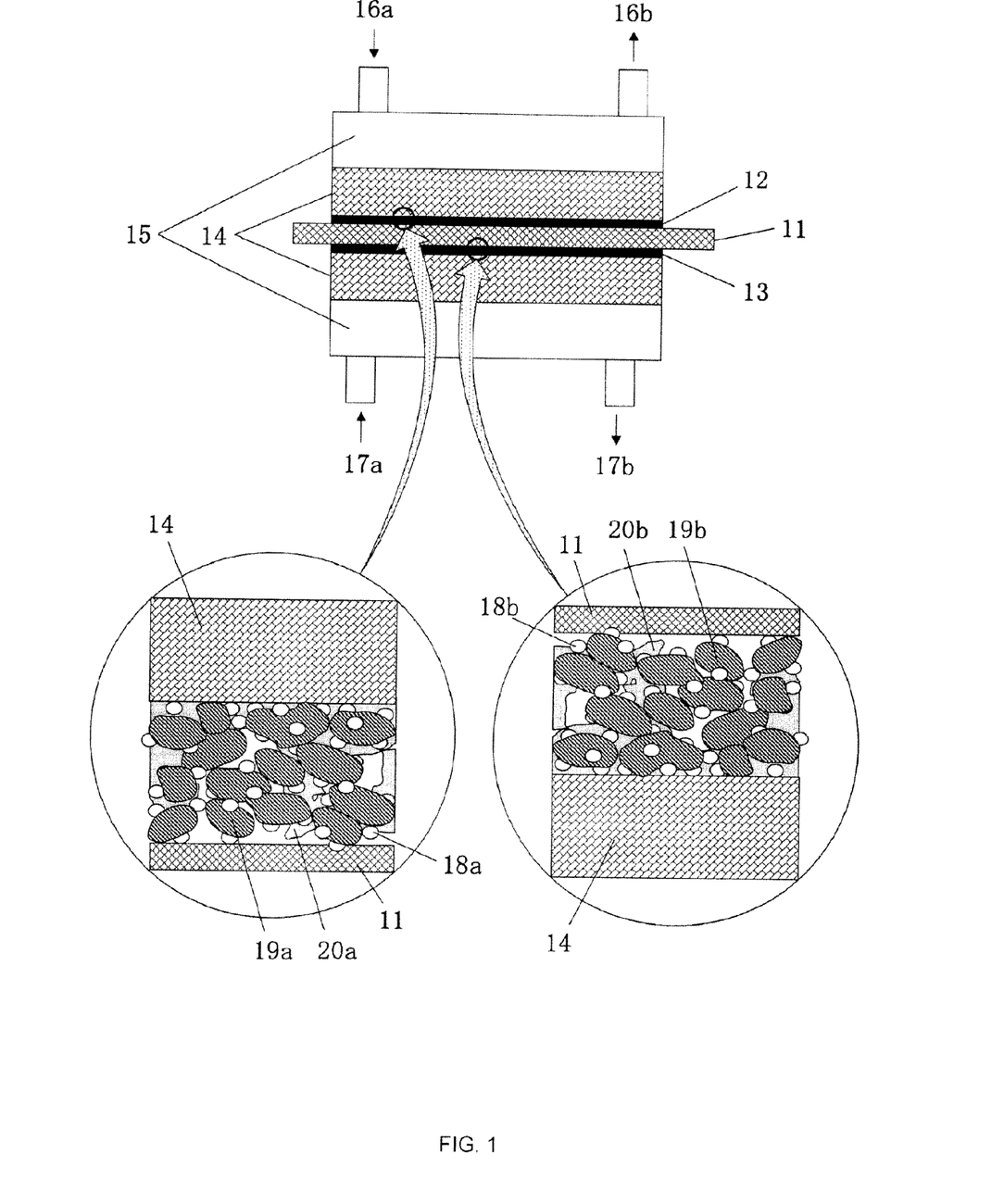
FIG. 1 shows an exemplary schematic view and enlarged views of the fuel cell of one embodiment.

FIG. 1 shows a schematic view of the fuel cell according to one embodiment. The reference sign 11 indicates an electrolyte membrane. The reference sign 12 indicates an anode electrode. The reference sign 13 indicate a cathode electrode. The reference sign 14 indicates a gas diffusion layer. The reference sign 15 indicates a separator. The reference sign 16a indicates an anode gas inlet. The reference sign 16b indicates an anode gas outlet. The reference sign 17a indicates a cathode gas inlet. The reference sign 17b indicates a cathode gas outlet. The reference signs 18a and 18b indicate an anode catalyst and a cathode catalyst, respectively. The reference signs 19a and 19b indicate an anode catalyst support and cathode catalyst support, respectively. The reference signs 20a and 20b indicate an anode electrolyte and a cathode electrolyte, respectively.

The term "electrolyte membrane" used in the present specification means an electrolyte membrane interposed between the anode electrode and the cathode electrode. The term "electrolyte" used in the specification means that an electrolyte which covers the catalyst and the catalyst support in the anode electrode and the cathode electrode.

The term "low humidity" means that an oxygen gas supplied to the cathode electrode has relative humidity of not less than 0% and not more than 40%. Even if the hydrogen gas supplied to the anode electrode has relative humidity of more than 40% (for example, 100%), it is described that the oxygen gas has "low humidity", as long as the oxygen gas supplied to the cathode electrode has relative humidity of not less than 0% and not more than 40%.

When the fuel cell is used at a temperature of not less than 0 degree Celsius and 100 degrees Celsius, preferably not less than room temperature (approximately, 25 degrees Celsius) and not more than 100 degrees Celsius, an example of the electrolyte membrane 11 is a proton conductive polymer electrolyte membrane made of perfluorosulfonate such as Nafion (registered trade mark).

When the fuel cell is used at a temperature of more than 50 degrees Celsius and not more than 200 degrees Celsius, preferably not less than 100 degrees Celsius and not more than 200 degrees Celsius, an example of the electrolyte membrane 11 is an electrolyte membrane having a proton conductivity property under a low humidity circumstance. An example of such an electrolyte membrane is (a) a proton conductive membrane obtained by mixing a dispersion aqueous solution containing $SnO_2$ and $NH_3$ with $H_3PO_4$, (b) an electrolyte membrane obtained by impregnating SiC (silicon carbide) with phosphoric acid and (c) an electrolyte membrane obtained by impregnating polybenzimidazole with phosphoric acid. The proton conductive membrane identified by the above-mentioned (a) is described in the international application having the international application No. PCT/JP2009/003793. The electrolyte membrane identified by the above-mentioned (b) may be used in a phosphoric acid fuel cell (hereinafter, referred to as "PAFC").

The anode electrode 12 comprises the anode catalyst 18a, the anode catalyst support 19a, and the anode electrolyte 20a. The anode catalyst 18a is made of platinum or alloy containing platinum. The anode catalyst 18a reduces hydrogen gas to generate proton. The anode catalyst support 19a is made of an electron-conductive material, preferably, carbon powders. The reason why the carbon powders are preferred as the electron-conductive material is that (1) the carbon powders hold the anode catalyst 18a easily, that (2) the carbon powders have high resistance to proton, which causes strong acidity, and that (3) the carbon powders have better electro-chemical stability.

An example of the anode electrolyte 20a is a commercially-available Nafion (registered trade mark, made by Aldrich) dispersion solution. The anode electrolyte 20a may be same as the cathode electrolyte 20b, which is described later.

The cathode electrode 13 comprises the cathode catalyst 18b, the cathode catalyst support 19b, and the cathode electrolyte 20b. The cathode catalyst 18b and the cathode catalyst support 19b may be the same as the anode catalyst 18a and the anode catalyst support 19a, respectively.

The cathode electrolyte 20b is a proton conductive material composed of $SnO_2$, $NH_3$, $H_2O$, and $H_3PO_4$. When X represents a molar ratio of $NH_3/SnO_2$ in this proton conductive material, and when Y represents a molar ratio of P/Sn in the proton conductive material, X is not less than 0.2 and not more than 5, and Y is not less than 1.6 and not more than 3.

Defects caused when X is less than 0.2 or more than 5 are described in the item titled as "Proton conductive material used as the cathode electrolyte", which is described later. Similarly, when defects caused when Y is less than 1.6 or more than 3 are described in the above-mentioned item.

The anode electrode 12 and the cathode electrode 13 may comprise a water-repellant reagent in order to ensure a gas path in the electrode and to drain water generated therein.

The anode electrode 12 may be fabricated by applying an ink solution to an anode support and drying. In the ink solution, the anode catalyst 18a, the anode catalyst support 19a, and the anode electrolyte 20a are dispersed in water or in a mixed solvent of water and an organic solvent. The cathode electrode 13 may be fabricated in the same manner as that of the anode electrode 12.

The anode electrode 12 and the cathode electrode 13 may be fabricated by the method described in the example, which is described later.

An example of a device for dispersing the anode electrolyte 20a or the cathode electrolyte 20b in water or in a mixed solvent of water and an organic solvent is a paint shaker, a rocking mill, a homogenizer, or a ball mill. An example of a device for painting the ink solution is a die coater, a bar coater, a screen printer, a spray coater, or a dispenser.

A method for joining the electrolyte membrane 11 to the anode electrode 12 can be appropriately selected from a method for attaching directly the anode electrode 12 to the electrolyte film 11 or a method including steps of: attaching the anode electrode 12 to a sheet made of polyethylene terephthalate and transcribing the anode electrode 12 to the electrolyte membrane 11 by hot press. A method for joining the electrolyte membrane 11 to the cathode electrode 13 can be selected similarly.

The same method as above described can be selected as a method for joining the gas diffusion layer 14 to the anode electrode 12, and as a method for joining the gas diffusion layer 14 to the cathode electrode 13.

A catalyst layer may be formed by painting the above-mentioned ink solution and drying it. A mixing-dispersing method and a painting method can be selected appropriately from the above-mentioned methods.

When an anode catalyst layer is formed on the gas diffusion layer 14, a layer consisted only of the anode catalyst support 19a may be formed on the gas diffusion layer 14. Subsequently, a layer made of the anode catalyst 18a is formed on the anode catalyst support 19a with use of a film forming method such as sputtering or vapor deposition. An example of a method for forming the layer made of the anode catalyst 18a on the layer consisted only of the anode catalyst support 19a is described below. A solution of platinum complex compound such as hexachloroplatinic acid is applied to the layer consisted only of the anode catalyst support 19a formed on the gas diffusion layer 14. Next, photoreduction, hydrogen reduction, or thermal treatment is performed. In this manner, a platinum catalyst (the anode catalyst 18a) layer is precipitated directly on the layer consisted only of the anode catalyst support 19a. The anode catalyst 12 is obtained by further painting a proton conductive material (or a proton conductive material containing water-repellant reagent) to the anode electrolyte 20a after the platinum catalyst layer is formed.

The same method as described above may be used, when the cathode electrode 13 is formed on the gas diffusion layer 14.

In the electric power generation method of the present disclosure, the fuel cell is maintained at a temperature of not less than 0 degrees Celsius and not more than 200 degrees Celsius. When the fuel cell is maintained at a temperature of less than 0 degrees Celsius, the water generated in the cathode electrode 13 is frozen. On the other hand, When the fuel cell is maintained at a temperature of more than 200 degrees Celsius, the phosphoric acid contained in the cathode electrolyte 20b is transformed to pyrophosphoric acid by dehydration synthesis.

In the electric power generation method of the present disclosure, the fuel cell is maintained preferably at a temperature of not less than 65 degrees Celsius and not more than 200 degrees Celsius, more preferably, not less than 65 degrees Celsius and not more than 150 degrees Celsius, much more preferably, not less than 65 degrees Celsius and not more than 120 degrees Celsius.

Hydrogen is supplied to the anode electrode 12. Electrons and protons are generated from the hydrogen by the anode catalyst 18a contained in the anode electrode 12. The generated proton reaches the cathode electrode 13 through the electrolyte membrane 11. Subsequently, the proton is bound to oxygen on the cathode catalyst 18b contained in the cathode electrode 13 to generate electric power.

Oxygen is supplied to the cathode electrode 13. The oxygen has relative humidity of not less than 0% and not more than 40%. As understood from the comparative examples which are described later, when oxygen has relative humidity of more than 40%, the electric power performance of the fuel cell of the present disclosure is lower than the electric power performance of the conventional fuel cell.

(Proton Conductive Material Used as the Cathode Electrolyte)

The proton conductive material used as the cathode electrolyte in the present disclosure is described below in more detail.

As described above, the proton conductive material (the proton conductive gel) used as the cathode electrolyte is composed of $SnO_2$, $NH_3$, $H_2O$, and $H_3PO_4$. When the molar ratio represented by $NH_3/SnO_2$ in the proton conductive material is X, and when the molar ratio represented by P/Sn is Y, X is not less than 0.2 and not more than 5, and Y is not less than 1.6 and not more than 3.

Figure 2:
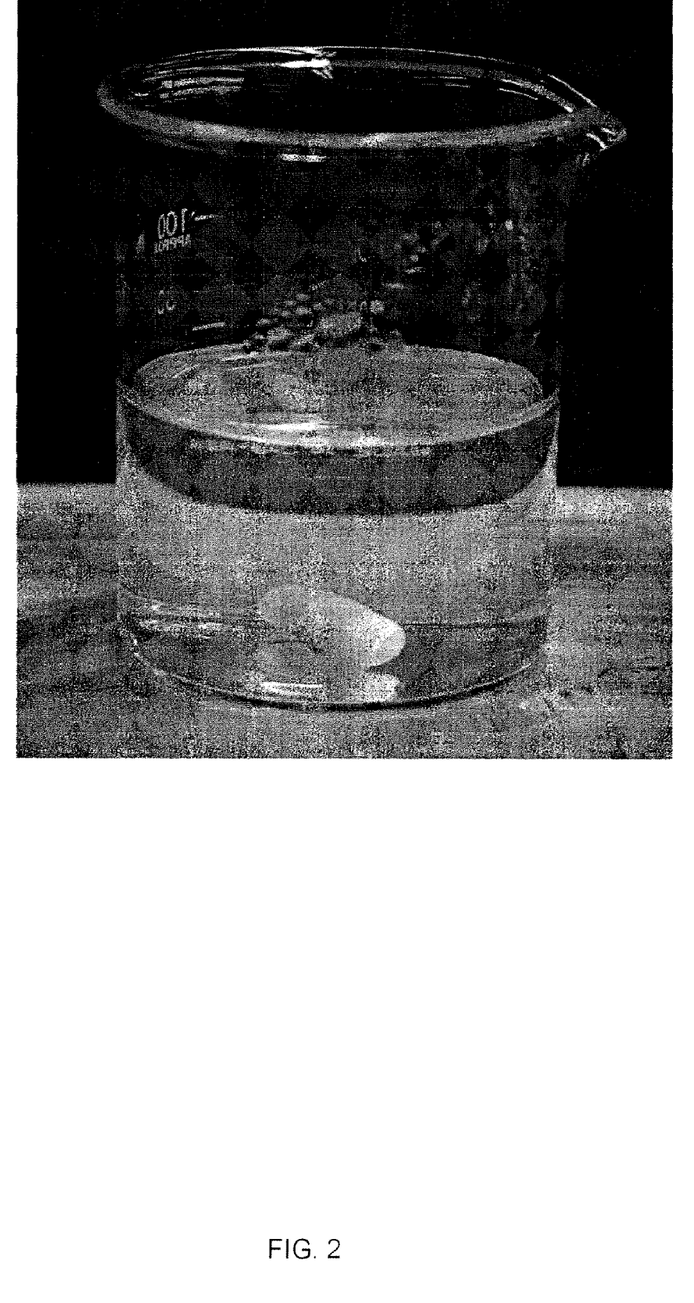
FIG. 2 shows an appearance photograph of the proton conductive material used in the present disclosure.

The proton conductive material is obtained by mixing $H_3PO_4$ with a solution composed of $SnO_2$ particles, $NH_3$, and $H_2O$ and then heating the mixed solution. The proton conductive material is a homogeneous gel material without phase separation. The proton conductive material has a structure where the $SnO_2$ particles, the $NH_3$, the $H_2O$ and the $H_3PO_4$ are networked in the gel. FIG. 2 shows an appearance photograph of the proton conductive material (the proton conductive gel).

The "networked structure" is a structure where the constituents contained in the proton conductive material exist stably and have interaction between constituents, while the constituents do not generate a compound. Even when the crystal of the proton conductive material is evaluated by an X-ray diffraction technique, only a diffraction peak of the $SnO_2$ particles is detected. Furthermore, the proton conductive material has a gel state without fluidity. The term "gel" used in the present specification is defined to be a material which satisfy the following equality: $Sb/Sa \leq 4$, wherein Sa is a projected area of the gel measured immediately after the gel was pushed out from a glass tube having a diameter of 1 centimeter onto a glass substrate, and Sb is a projected area measured after one hour since the gel was placed on the glass substrate.

The proton conductive material is maintained at a state where neither phase separation nor sedimentation is occurred, where the gel exists stably, and where the gel has a networked structure. The proton conductive material has an excellent water holding capacity and an excellent proton conductivity under a low humidity.

Accordingly, the fuel cell which uses the proton conductive material as a cathode electrolyte allows to generating an electric power under a low humidity.

Since the proton conductivity material is a gel, the oxygen gas supplied to the cathode electrode 13 is prevent from diffusing outside, when the proton conductive material is used as the cathode electrode. Furthermore, "dripping", which is a problem generated when liquid such as $H_3PO_4$ is used as an electrolyte, is not generated.

An example of fabrication of the proton conductive material used as the cathode electrolyte in the present disclosure is described below together with the property and the structure of the proton conductive material.

Figure 3:
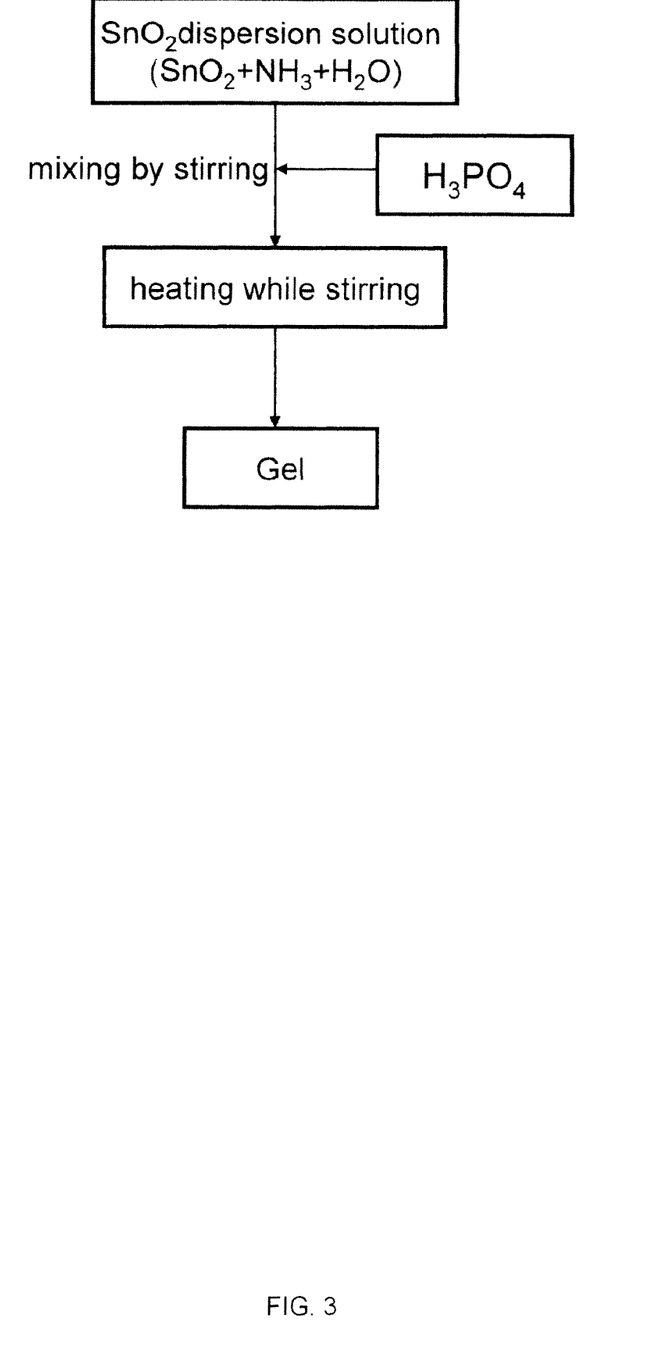
FIG. 3 shows an exemplary flow chart of the fabrication procedure of the proton conductive material.
Figure 4:
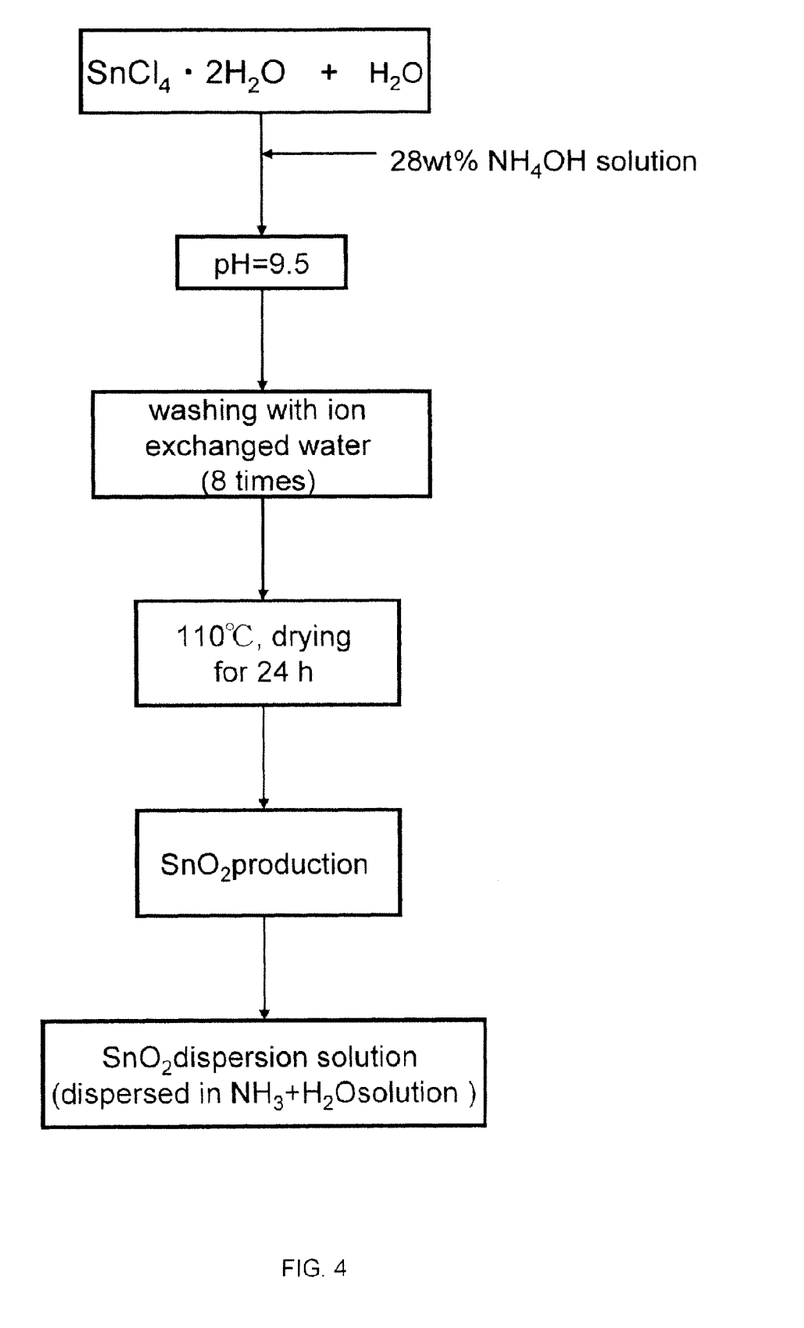
FIG. 4 shows an exemplary flow chart of the fabrication procedure of a $SnO_2$ dispersion solution, which is a raw material of the proton conductive material.

FIG. 3 shows a flow chart of the production procedure of the proton conductive material. FIG. 4 shows a method for preparing a $SnO_2$ dispersion solution (a solution obtained by dispersing $SnO_2$ particles into the $NH_3$ and $H_2O$), which is a raw material of the proton conductive material.

First, a $SnO_2$ dispersion solution in which $SnO_2$ particles with a particle size of 2 nanometers are dispersed into $NH_3$ and $H_2O$ is prepared. In the dispersion solution, the $SnO_2$ particles are dispersed as $SnO_2$ colloids. The $SnO_2$ colloids may be fabricated by an ordinal method. For example, as shown in FIG. 4, the $SnO_2$ colloids may be fabricated by using $SnCl_4 \cdot 2H_2O$ as a starting material.

40 g of the $SnO_2$ dispersion solution having a molar ratio X=0.2 was weighed as a starting material. The $SnO_2$ concentration was 8% by weight. This $SnO_2$ dispersion solution was colorless and transparent.

The distribution of the $SnO_2$ particle size was determined using a back-scattering method.

The primary particle size had a peak around 2 nanometers, whereas the secondary particle size had a peak around 17 nanometers. Namely, it was proven that many of the $SnO_2$ particles are dispersed in $H_2O$ although a part of them aggregate in $H_2O$. It was believed that $NH_3$ presents as a counter ion on the surface of $SnO_2$, and plays a role in preventing aggregation of the $SnO_2$ particles in this state.

Next, a 28% by weight of $NH_4OH$ solution was added to the 40 g of a solution of $SnO_2$ particles dispersed as above for changing the amount of $NH_3$, and a plurality of $SnO_2$ dispersion solutions having the X value of from 0 to 200 were prepared.

Finally, 85% $H_3PO_4$ prepared at a room temperature was added to the plurality of the $SnO_2$ dispersion solutions to prepare samples having the molar ration Y of not less than 1 and not more than 5.

When the proton conductive gel is prepared, it is necessary that a $NH_4OH$ solution is added to the $SnO_2$ dispersion solution first, and that a $H_3PO_4$ solution has to be added to the $SnO_2$ dispersion solution subsequently. In case where the $H_3PO_4$ solution is added to the $SnO_2$ dispersion solution before the $NH_4OH$ solution is added, the $SnO_2$ particles were transformed from the dispersion state to the aggregated state, and the transparency of the $SnO_2$ dispersion solution was lost.

It is believed that this reason is that the $SnO_2$ particles could not keep a homogenously dispersed state in the solution and aggregated inhomogeneously.

When the X value of the $SnO_2$ dispersion solution is close to 0, the dispersion of the $SnO_2$ particles could not be maintained. When the X value of the $SnO_2$ dispersion solution is less than 0.2, the $SnO_2$ particles aggregated and precipitated.

After samples of the $SnO_2$ dispersion solutions each having predetermined X and Y values were prepared, each sample was heated to 80 degrees Celsius, and stirred for twelve hours. After stirred, each sample was classified into a transparent gel sample or an opaque sample. Table 1 shows the classification result. In Table 1, "A" indicates a sample being transparent and gelatinous, and "B" and "C" indicate a clouded sample, which does not have desirable transparency.

TABLE 1

|  |  | P/Sn Y | | | | | | | |
|---|---|---|---|---|---|---|---|---|---|
|  |  | 1 | 1.6 | 2 | 3 | 4 | 5 | 10 | 20 |
| X $NH_3/SnO_2$ | 0.1 | B | D | D | D | D | D | D | D |
|  | 0.2 | B | A | A | A | D | D | D | D |
|  | 5 | B | A | A | A | D | D | D | D |
|  | 8 | C | C | C | C | C | C | C | C |
|  | 20 | C | C | C | C | C | C | C | C |
|  | 200 | C | C | C | C | C | C | C | C |

A: gel
B: $SnO_2$, clouded
C: ammonium phosphate, precipitated
D: not gelated

As is clear from Table 1, when X is less than 0.2, sedimentation and white turbidity to be believed due to the aggregation of $SnO_2$ were generated. When X is more than 5, white turbidity was generated. On the contrary, as is clear from Table 1, when Y is not less than 1.6 and not more than 3, the $SnO_2$ dispersed solution is a gel. When Y is less than 1.6 or more than 3, the $SnO_2$ dispersed solution is not a gel since it has fluidity.

Accordingly, in order to obtain a homogeneous gel, X is not less than 0.2 and not more than 5, and Y is not less than 1.6 and not more than 3.

Next, the samples of the proton conductivity gel prepared as above were subjected to the following evaluation.

First, in order to ascertain crystal contained in the proton conductivity gel, the gel samples were subjected to X-ray diffraction. The X-ray diffraction was performed to ascertain whether or not $SnO_2$ had reacted with $NH_3$ and $H_3PO_4$. A thermogravimetry of the gel sample was also performed together with the X-ray diffraction. The amount of the $H_2O$ contained in the gel sample, the elimination of $H_2O$ under a temperature of not less than 100 degrees Celsius, and the reaction between the constituents were investigated.

The water content ratio of precursor materials of the proton conductive gel and thermogravimetry of the amount of the $H_2O$ contained in the proton conductive gel at a temperature of 100 degrees Celsius and the amount change of the contained $H_2O$ between 100 degrees Celsius and 200 degrees Celsius were measured. On the basis of the measured values, a water holding capacity of the proton conductive gel was evaluated. Furthermore, the proton conductive property of the proton conductive gel was also evaluated.

Figure 5:
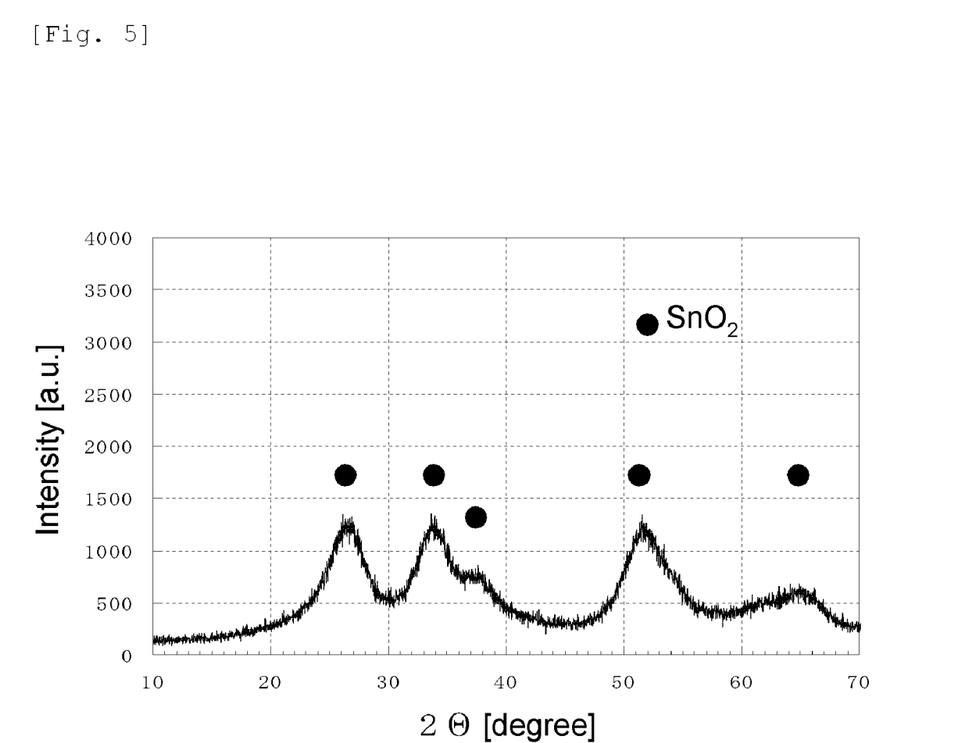
FIG. 5 shows an X-ray diffraction graph after the proton conductive gel (X=0.2 and Y=3) is heated to 200 degrees Celsius.

FIG. 5 shows the X-ray diffraction result after the proton conductive gel having the X value of 0.2 and the Y value of 3 was heated to 200 degrees Celsius. As shown in FIG. 5, only diffraction peaks based on the $SnO_2$ were observed. The diffraction peaks were broad. Namely, in the proton conductive gel, only $SnO_2$ was crystallized. Furthermore, it was believed that the size of crystallized $SnO_2$ was rather small. From the X-ray diffraction results, $SnO_2$ did not react with $H_3PO_4$ or $NH_3$. Accordingly, it was believed that a big crystal was not deposited and that a reactant was not generated.

On the other hand, from the measurement result of the particle size according to the back-scattering method, it was confirmed that the proton conductive gel having the X value of 0.2 and the Y value of 3 had a peak at 46 nanometers. From this value, it was believed that the $SnO_2$ particles reacted with neither $NH_3$ nor $H_3PO_4$, and that $NH_3$, $H_3PO_4$ and $H_2O$ didn't react with one another. However, it was believed that the $SnO_2$ particles contained in the proton conductive gel had larger particle size than the $SnO_2$ particle before $NH_3$ and $H_3PO_4$ were added.

The X-ray diffraction result and the measurement result of the particle size suggested that $SnO_2$, $NH_3$, $H_2O$ and $H_3PO_4$, each has an electric charge in the gel, and that they exist stably in a cluster state where they interact with one another electrostatically.

It was believed that this state is the "networked" state. Namely, it was believed that these four compounds ($SnO_2$, $NH_3$, $H_2O$, and $H_3PO_4$) did not chemically react, but, that they present in a stable state where they interact strongly with one another electrostatically. It was believed that such a stable state contributes heat stability and proton conductivity of the proton conductive gel strongly, which are described later.

Figure 6:
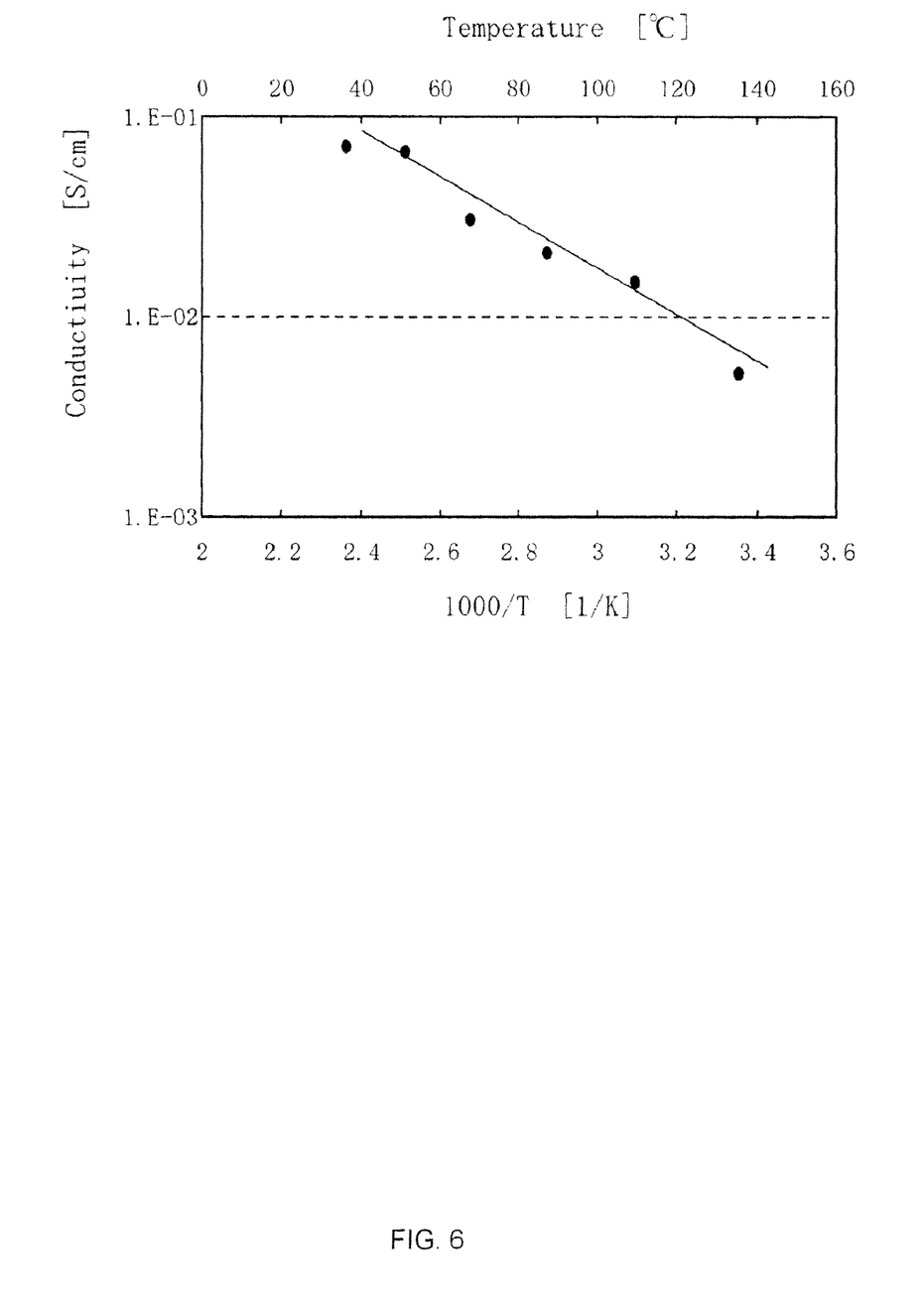
FIG. 6 shows a graph regarding the proton conductive property of the proton conductive gel (X=0.2 and Y=3).

FIG. 6 shows the measurement results of the proton conductivity of the proton conductive gel having the X value of 0.2 and the Y value of 3. Table 2 shows the proton conductivity at a temperature of 100 degrees Celsius of each of the proton conductive gels as shown in FIG. 1.

TABLE 2

|  |  | P/Sn Y | | | | | | | |
|---|---|---|---|---|---|---|---|---|---|
|  |  | 1 | 1.6 | 2 | 3 | 4 | 5 | 10 | 20 |
| $NH_3/SnO_2$ X | 0.1 |  |  |  |  |  |  |  |  |
|  | 0.2 | $2.3 \times 10^{-5}$ | $1.0 \times 10^{-2}$ | 2.8 | $2.0 \times 10^{-1}$ |  |  | $5.0 \times 10^{-5}$ |  |
|  | 5 |  | $2.1 \times 10^{-3}$ |  | $3.9 \times 10^{-3}$ |  |  |  |  |
|  | 8 |  |  |  | $2.7 \times 10^{-5}$ |  |  |  |  |
|  | 20 |  | $3.2 \times 10^{-4}$ |  | $1.4 \times 10^{-4}$ |  |  |  |  |
|  | 200 |  |  |  |  |  |  |  |  |

Figure 7:
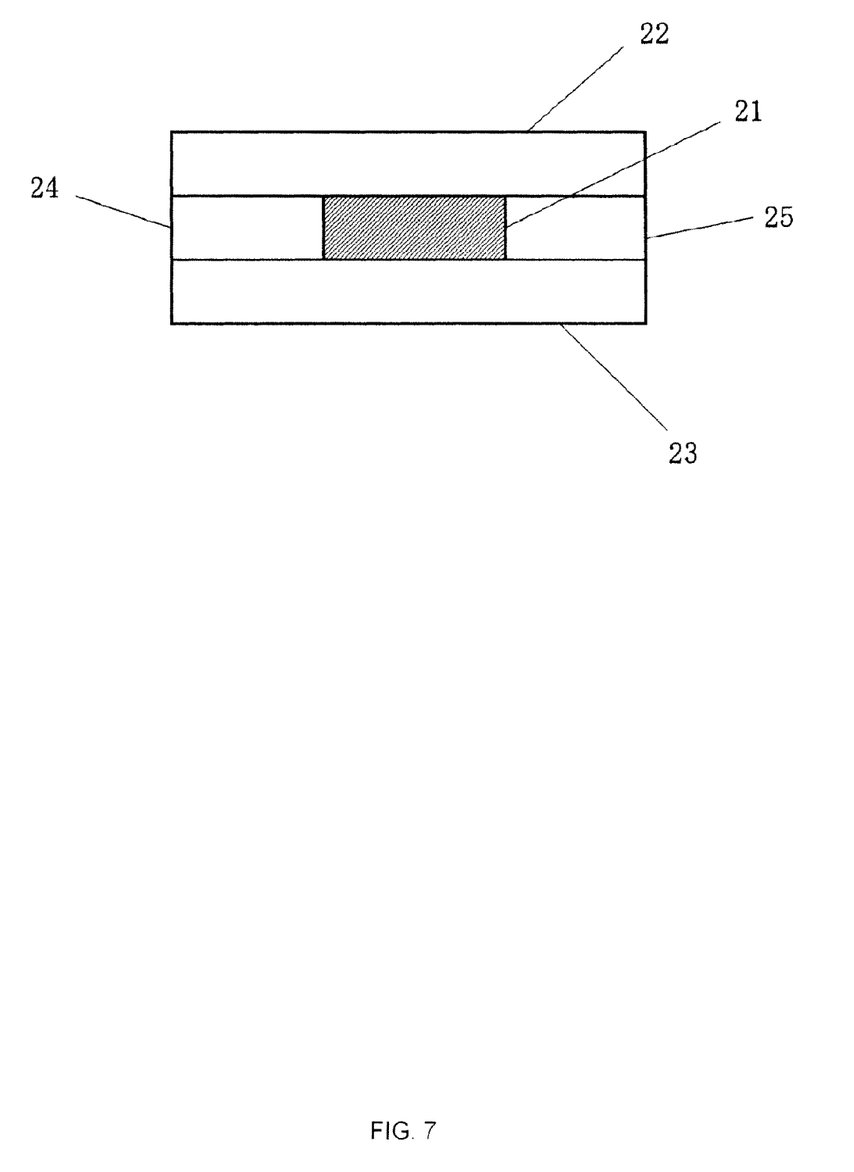
FIG. 7 shows an exemplary schematic cross-sectional view of a sample strip for measuring a proton conductive degree.

FIG. 7 shows a schematic view of the sample chip for the measurement of the proton conductivity. The sample chip shown in FIG. 7 was fabricated according to the following procedure.

First, an electrode sheet 23 having a size of 18 millimeters× 18 millimeters was prepared. The electrode sheet 23 was composed of carbon fibers each having a diameter of 20 micrometers. The electrode sheet 23 had a thickness of approximately 0.135 millimeters. Next, insulators 24 and 25 each composed of a polyimide film were placed on an electrode sheet 23. The insulators 24 and 25 had a thickness of 0.2 millimeters each. An opening having a diameter of 8 millimeters was beforehand provided each with the insulators 24 and 25.

After a drop of the proton conductive material (the proton conductive gel) was applied into the opening, an electrode sheet 22 was placed on the insulators 24 and 25 to obtain the sample chip. Subsequently, the sample chip was fixed by a spring (not shown).

The proton conductivity of the proton conductive gel was measured by an alternate current impedance measurement with use of a network analyzer. A direct current resistance was also measured during the measurement of the proton conductivity. A direct current impedance component was removed from the measured proton conductivity to evaluate the proton conductivity.

As a result, the proton conductivity was increased together with rising temperature. A high conductivity of $10^{-1}$ S/cm was obtained even at the temperature of not less than 100 degrees Celsius.

In order to operate the fuel cell, it is preferred that the proton conductivity of the proton conductive material is not less than $10^{-3}$ S/cm, more preferably, not less than $10^{-1}$ S/cm.

Figure 8:
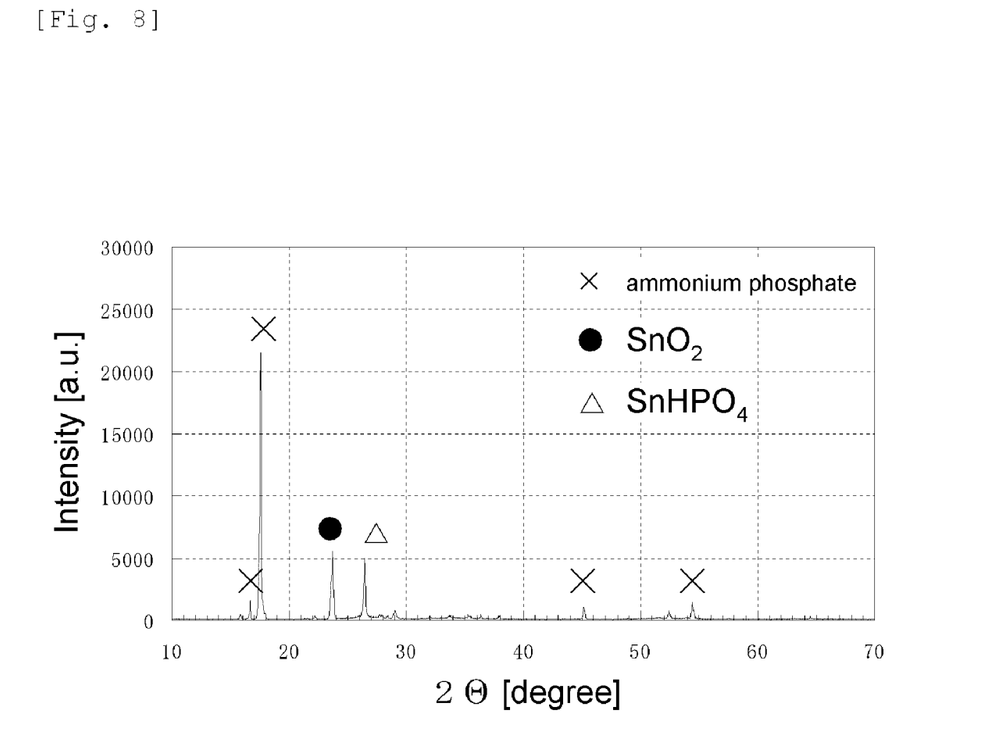
FIG. 8 shows an X-ray diffraction graph of the proton conductive gel having the X value of 200 and the Y value of 5.

FIG. 8 shows the X-ray diffraction graph of the proton conductive gel sample having the X value of 200 and the Y value of 5. When X is large, white turbidity was generated in the sample. A peak of ammonium dihydrogen phosphate or ammonium hydrogen phosphate was detected in the X-ray diffraction graph. A peak of $SnHPO_4$ was also detected in the X-ray diffraction graph. Since a crystal phase different from that of $SnO_2$ was detected when X is large, it is ascertained that $SnO_2$, ammonium dihydrogen phosphate (or ammonium hydrogen phosphate), and $SnHPO_4$ were mixed in the proton conductive gel sample.

It is believed that this reason is due to excess amount of $NH_3$ which is more than an amount of $NH_3$ necessary for dispersing $SnO_2$ stably. It is believed that the excess $NH_3$ may react with $H_3PO_4$ in $H_2O$, and may be precipitated as ammonium phosphate compound. It is believed that the excess $NH_3$ may have a harmful influence on the proton conductivity and on the water holding capacity.

Figure 9:
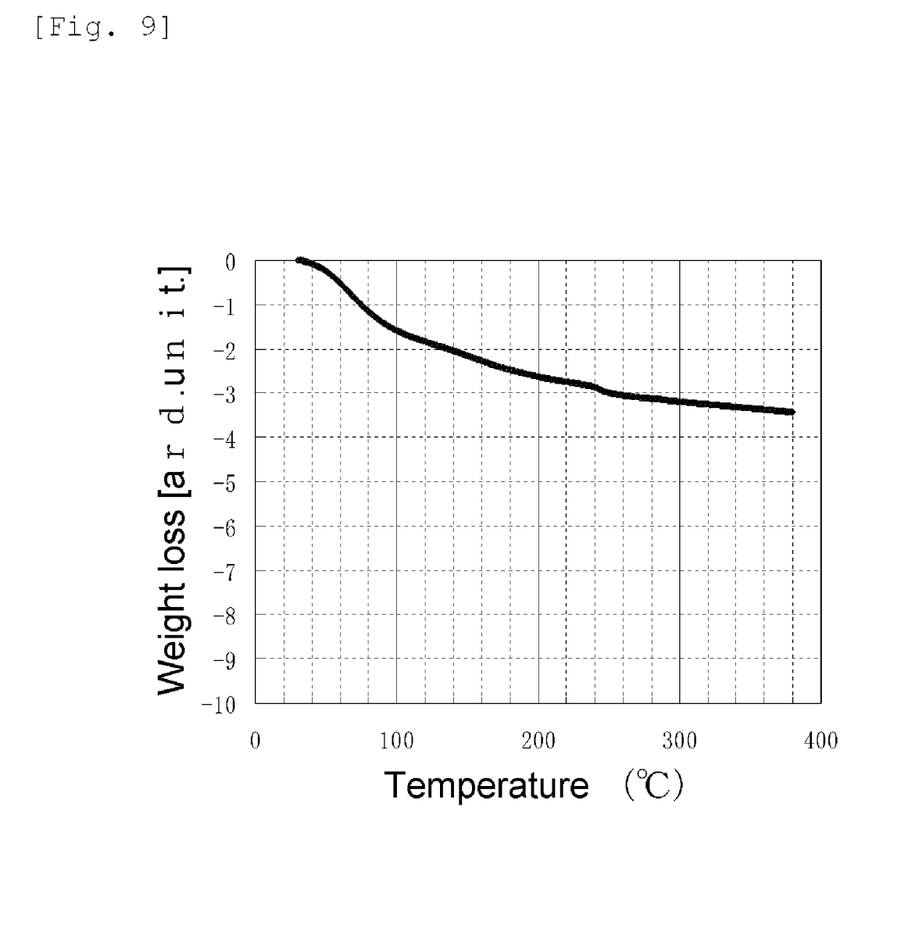
FIG. 9 shows a heat analysis graph of the proton conductive gel having X=0.02 and Y=3.

FIG. 9 shows the thermogravimetry graph of the proton conductive gel having the X value of 0.2 and the Y value of 3. As shown in FIG. 9, elimination (isolation) of $H_2O$ was detected under a temperature of 100 degrees Celsius or less. In the light of the weight at a temperature of 100 degrees Celsius and the amount of water in precursor materials of proton conductive gel, the amount of the water at a temperature of 100 degrees Celsius could be evaluated. The weight change between 100 degrees Celsius and 200 degrees Celsius could be also evaluated. The amount change of $H_2O$ contained in the gel could be also evaluated.

As described above, it was ascertained that the proton conductive gel was composed of $SnO_2$, $NH_3$, $H_2O$ and $H_3PO_4$, and that these four constituents did not interact with one another, and that the proton conductive gel was a stable gel at a temperature of 100 to 200 degrees Celsius.

Furthermore, it was ascertained that the proton conductive gel having the X value of not less than 0.2 and not more than 5 and having the Y value not less than 1.6 and not more than 3 had a proton conductivity of $1\times10^{-3}$ S/cm or more, and that the proton conductive gel was suitable as an electrolyte of the fuel cell.

Next, the water holding capacity of the proton conductive gel was evaluated. Table 3 shows a measurement result of the water holding capacity of the proton conductive gel.

TABLE 3

| | Y (X = 0.2) | | | | | |
|---|---|---|---|---|---|---|
| | 1 | 1.6 | 2 | 3 | 4 | 5 |
| Weight loss [%] up to 200° C. | 70 | 27 | 18 | 14 | 22 | 14 |
| Weight loss, 100° C. to 200° C. [%] | 3 | 4 | 6 | 5 | 7 | 8 |
| Remaining water content [%] (when the temperature was 200° C.) | | | 49 | 46 | 44 | |

From the weight loss up to 200 degrees Celsius and the weight loss between 100 degrees Celsius and 200 degrees Celsius, the water holding capacity of the proton conductive gel was evaluated.

When the fabrication of the proton conductive gel was started, $H_2O$ was excess and the initial water amount contained in the proton conductive gel was eighty percent of the total weight. After this, the proton conductive gel was heated to 80 degrees Celsius with being stirred to remove the excess water. Furthermore, the heating temperature was increased up to 200 degrees Celsius. From the amount of the removed water at a temperature of 200 degrees Celsius and from the amount of the evaporation between 100 degrees Celsius and 200 degrees Celsius, each of the weight loss shown in Table 3 was calculated.

As is clear from Table 3, when Y is less than 1.6, the weight loss between 100 degrees Celsius and 200 degrees Celsius was small. However, the weight loss up to 200 degrees Celsius (between 80 degrees Celsius and 200 degrees Celsius) was large.

On the other hand, when Y is more than 3, each the weight loss was small; however, the proton conductive material heated to a temperature of 200 degrees Celsius was not a gel but a sol.

As is clear from Table 3, the weight loss between 100 degrees Celsius and 200 degrees Celsius is 4 to 6%, and excellent weight stability can be achieved. Furthermore, since the ratio of the water contained in the proton conductive gel after heated at a temperature of 200 degrees Celsius was 44 weight % to 49 weight %. This suggests that the proton conductive gel has a significantly large amount of water.

Example of Fabricating the Electrode for a Fuel Cell

A cathode electrode was fabricated using the above-mentioned proton conductive gel. A fuel cell comprising the cathode electrode was fabricated. The function of the fuel cell was evaluated under a low humidity.

In order to compare the functional difference only based on the electrolyte between the anode electrode and the cathode electrode, three electrodes were fabricated according to the following procedure.

Example 1 of Fabricating the Electrode

First, a catalyst support made of carbon was formed on the gas diffusion layer. Then, platinum (namely, the catalyst) was sputtered on the catalyst support. Finally, the proton conductive gel was painted to the catalyst support, and dried so as to form the electrolyte.

More specifically, used was GDL24BC (available from SGL carbon), in which the catalyst support containing a water-repellant reagent was formed on the gas diffusion layer. Platinum was sputtered on the GDL24BC in such a manner that an amount of the catalyst was 0.3 mg/cm². Finally, the proton conductive gel having the X value of 0.2 and the Y value of 3 was painted. The proton conductive gel was dried at a temperature of 100 degrees Celsius to form the electrode. The electrolyte after dried had a density of 10 mg/cm².

Example 2 of Fabricating the Electrode

The electrode was fabricated similarly to the case of example 1 except that phosphoric acid (liquid) was used as the electrolyte.

Example 3 of Fabricating the Electrode

The electrode was fabricated similarly to the case of example 1 except that a commercially-available Nafion (Registered trade mark) dispersion liquid (available from Aldrich Company, 5 wt %, mixed solvent of water and alcohol) was used.

Three fuel cells of the example 1, the comparative example 1, and the comparative example 2 shown in Table 4 were fabricated by combining each of the electrodes according to the examples 1-3 of fabricating the electrode with Nafion 117 (Registered trade mark), which was used as an electrolyte membrane. The current-voltage properties of these fuel cells were evaluated.

TABLE 4

| | Anode electrode | Electrolyte membrane | Cathode electrode |
|---|---|---|---|
| Example 1 | Example 3 of fabricating the electrode | Nafion 117 (Registered trade mark) | Example 1 of fabricating the electrode |
| Comparative example 1 | Example 3 of fabricating the electrode | Nafion 117 (Registered trade mark) | Example 2 of fabricating the electrode |
| Comparative example 2 | Example 3 of fabricating the electrode | Nafion 117 (Registered trade mark) | Example 3 of fabricating the electrode |

The condition during the evaluation of the current-voltage property of the fuel cell was described below:
  Hydrogen flow rate in the anode side: 100 ml/minute;
  Oxygen flow rate in the cathode side: 250 ml/minute;
  Operation temperature of the fuel cell: 65 degrees Celsius to 120 degrees Celsius.

First, in order to maintain the proton conductivity in the Nafion (Registered trade mark), which was an anode electrolyte, the relative humidity in the anode side was adjusted to 100% RH. The current-voltage property was evaluated by varying the relative humidity of the oxygen supplied to the cathode electrode.

More particularly, the dew point of an anode gas (hydrogen gas) was fixed at 65 degrees Celsius. The temperature of the fuel cell was fixed at 65 degrees Celsius. The following gases (1) to (5) were supplied:
  (1) cathode gas having a dew point of 65 degrees Celsius (oxygen gas having relative humidity of 100%),
  (2) cathode gas having a dew point of 50 degrees Celsius (oxygen gas having relative humidity of 52%),
  (3) cathode gas having a dew point of 40 degrees Celsius (oxygen gas having relative humidity of 31%),
  (4) cathode gas having a dew point of 23 degrees Celsius (oxygen gas having relative humidity of 18%), and
  (5) cathode gas having a dew point of not more than 0 degrees Celsius (oxygen gas having relative humidity of 0%).

Figure 10:
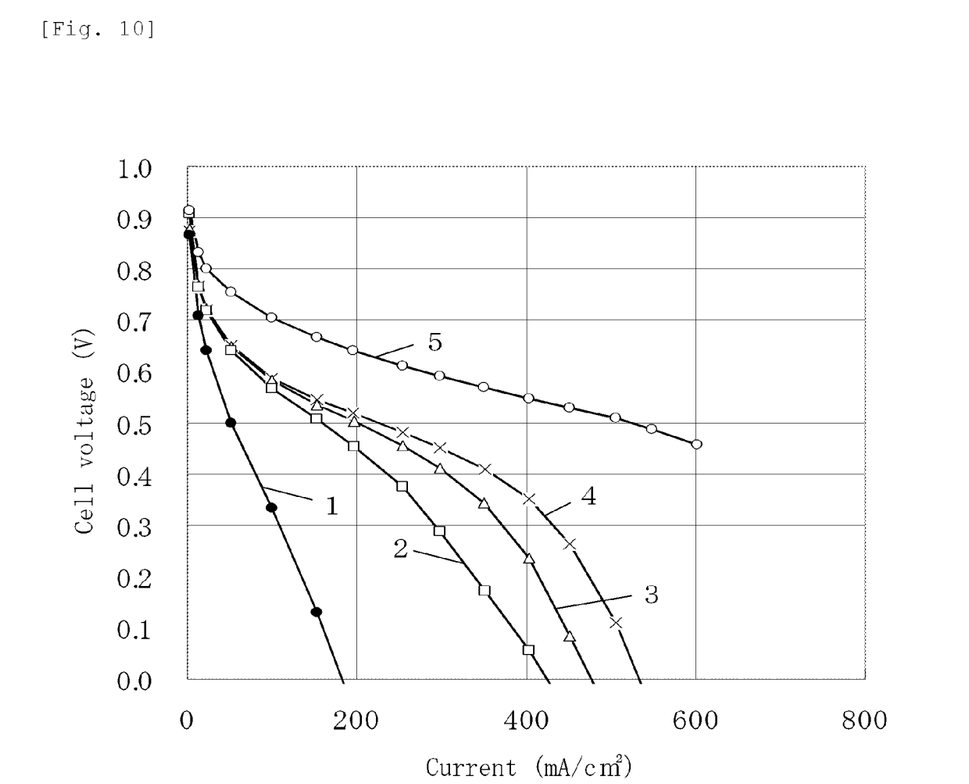
FIG. 10 shows a graph relative to the current-voltage property of the fuel cell according to the example 1.

FIG. 10 shows a graph relative to the current-voltage property of the fuel cell according to the example 1. The reference signs in FIG. 10 correspond to the gases represented by the above-mentioned numerals (1) to (5). It was ascertained that the fuel cell according to the example 1 has an excellent electric power-generating property under low humidity.

Figure 11:
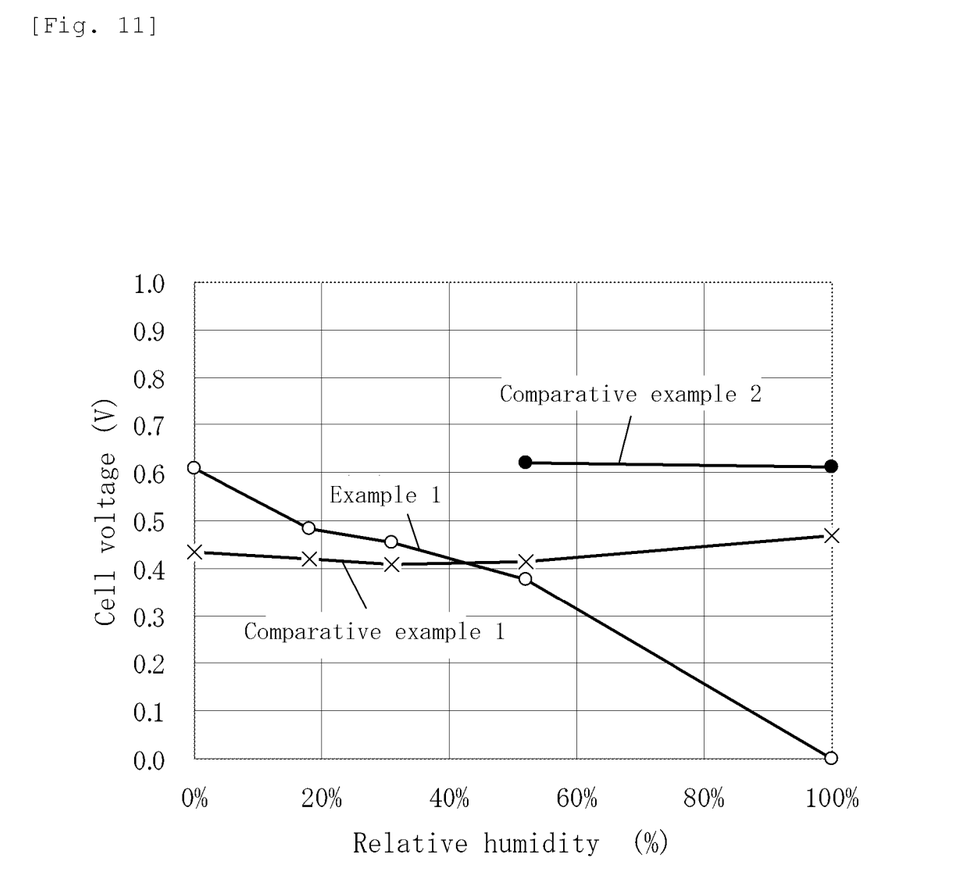
FIG. 11 shows a graph about a relative humidity dependency of the fuel cell.

The current-voltage properties of the comparative examples 1 and 2 were evaluated similarly to the case of the example 1. FIG. 11 shows a graph where the cell voltages of the fuel cells according to the example 1 and the comparative examples 1-2 were plotted with regard to the relative humidity in a case where the current density is 240 mA/cm². As shown in FIG. 11, the change of the relative humidity did not influence the current-voltage property of the fuel cell according to the comparative examples 1. However, the fuel cell according to the comparative example 2 failed to operate, when the cathode gas having a dew point of not more than 40 degrees Celsius (oxygen gas having relative humidity of not more than 31%) was supplied to the cathode electrode.

As understood from FIG. 11, the fuel cell according to the example 1 outputs a higher voltage in the low humidity of 31% or less than the fuel cells according to the comparative examples 1-2. Namely, it is ascertained that the fuel cell according to the example 1 outputs a higher voltage under low humidity of not less than 0% and not more than 40% than the fuel cell according to the comparative example 1.

Next, the current-voltage property of the fuel cell was evaluated, when the operation temperature was changed to 65 degrees Celsius, 90 degrees Celsius, and 120 degrees Celsius.

The condition during the evaluation of the current-voltage property of the fuel cell was described in Table 5.

TABLE 5

| Operation temperature | Anode gas | Cathode gas |
|---|---|---|
| 65 degrees Celsius | hydrogen gas having a dew point of 65 degrees Celsius (hydrogen gas having relative humidity of 100%) | oxygen gas having a dew point of not more than 0 degrees Celsius (Dry oxygen gas having relative humidity of 0%) |
| 90 degrees Celsius | hydrogen gas having a dew point of 90 degrees Celsius (hydrogen gas having relative humidity of 100%) | oxygen gas having a dew point of not more than 0 degrees Celsius (Dry oxygen gas having relative humidity of 0%) |
| 120 degrees Celsius | hydrogen gas having a dew point of 90 degrees Celsius (hydrogen gas having relative humidity of 35%) | oxygen gas having a dew point of not more than 0 degrees Celsius (Dry oxygen gas having relative humidity of 0%) |

Figure 12:
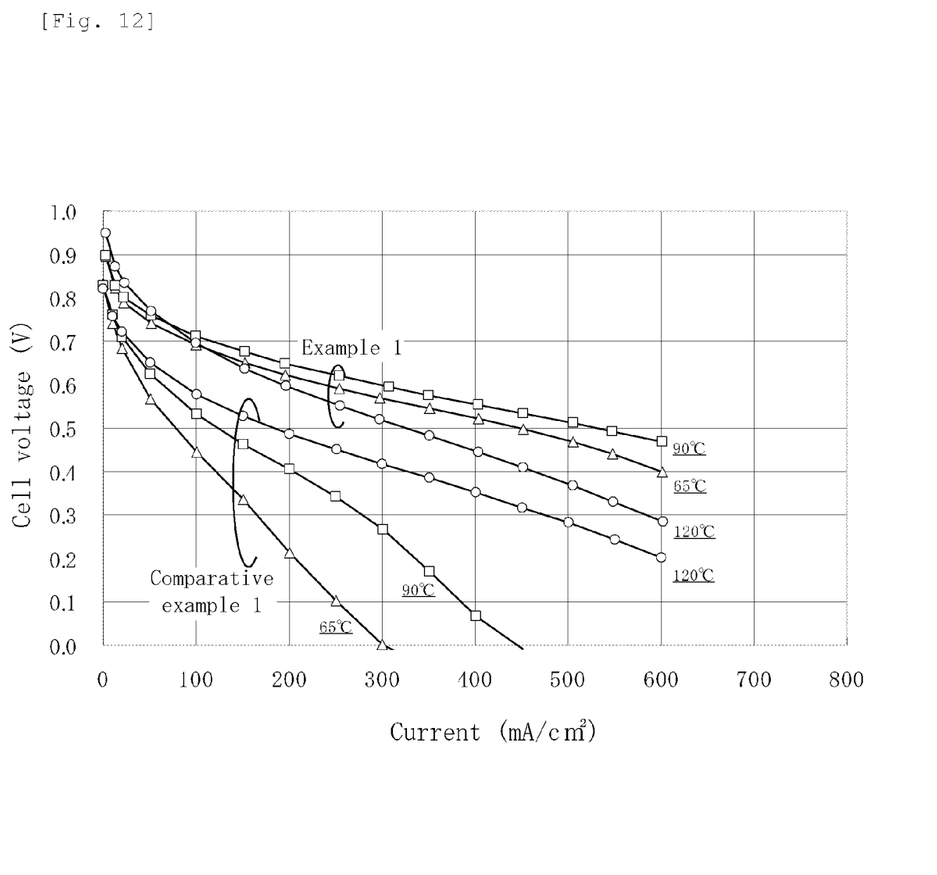
FIG. 12 shows a graph relative to the current-voltage properties of the example 1 and the comparative example 2.

FIG. 12 shows a graph relative to the current-voltage properties of the fuel cells of the example 1 and the comparative example 2.

As understood from FIG. 12, the fuel cell according to the example 1 had a small overvoltage and an excellent electric power generation property under low humidity. When the operation temperature was 120 degrees Celsius, the cell voltage of the fuel cell according to the comparative example 2 under the current density of 100 mA/cm or less was significantly lower than that of the example 1. On the contrary, the decrease of the cell voltage of the fuel cell according to the example 1 due to the decrease of the operation temperature was relatively small. As described above, it was ascertained that the fuel cell according to the example 1 had a large electric power generation property even over 100 degrees Celsius.

The fuel cell according to the comparative example 2 failed to generate electric power in any operative temperatures (Not shown in FIG. 12).

From the description hereinabove, many modifications and other embodiments of the present disclosure are apparent to persons skilled in the art. Accordingly, the foregoing description should be construed merely as an illustrative example, which was provided for the purpose of teaching best modes for carrying out the present disclosure to persons skilled in the art. Details of the construction and/or function of the present disclosure can be substantially altered without departing from the spirit thereof.

INDUSTRIAL APPLICABILITY

The fuel cell is capable of operating under low humidity and does not require a humidifier. The fuel cell is useful in the fuel cell field.

REFERENTIAL SIGNS LIST

11: electrolyte membrane
12: anode electrode
13: cathode electrode
14: gas diffusion layer
15: separator
16$a$: anode gas inlet
16$b$: anode gas outlet
17$a$: cathode gas inlet
17$b$: cathode gas outlet
18$a$: anode catalyst
18$b$: cathode catalyst
20$a$: anode electrolyte
20$b$: cathode electrolyte
21: proton conductive material
22: electrode sheet
23: electrode sheet
24: insulator
25: insulator

What is claimed is:

1. A method for generating an electric power with use of a fuel cell,
the method comprising steps of:
(a) preparing the fuel cell comprising:
an electrolyte membrane;
an anode electrode comprising an anode catalyst, an anode catalyst support, and an anode electrolyte; and
a cathode electrode comprising a cathode catalyst, a cathode catalyst support, a cathode electrolyte; wherein:
the electrolyte membrane is interposed between the anode electrode and the cathode electrode,
the anode catalyst is held on the anode catalyst support,
the anode electrolyte covers the anode catalyst and the anode catalyst support,
the cathode catalyst is held on the cathode catalyst support,
the cathode electrolyte covers the cathode catalyst and the cathode catalyst support,
the cathode electrolyte is composed of $SnO_2$, $NH_3$, $H_2O$, and $H_3PO_4$,
the cathode electrolyte is a transparent gel,
a molar ratio X represented by $X=NH_3/SnO_2$ is not less than 0.2 and not more than 5, and
a molar ratio Y represented by $Y=P/Sn$ is not less than 1.6 and not more than 3; and
(b) supplying hydrogen to the anode electrode and supplying oxygen having relative humidity of not less than 0% and not more than 40% to the cathode electrode while the fuel cell is maintained at a temperature of not less than 0 degrees Celsius and not more than 200 degrees Celsius so as to generate a potential difference between the anode electrode and the cathode electrode.

2. The method according to claim 1, wherein
in the step (b), the fuel cell is maintained at a temperature of not less than 65 degrees Celsius.

3. The method according to claim 1, wherein
in the step (b), the fuel cell is maintained at a temperature of more than 100 degrees Celsius.

4. The method according to claim 1, wherein
in the step (b), the fuel cell is maintained at a temperature of not more than 120 degrees Celsius.

5. The method according to claim 1, wherein
in the step (b), the fuel cell is maintained at a temperature of not less than 65 degrees Celsius and not more than 200 degrees Celsius.

6. The method according to claim 1, wherein
in the step (b), the fuel cell is maintained at a temperature of not less than 65 degrees Celsius and not more than 150 degrees Celsius.

7. The method according to claim 1, wherein
in the step (b), the fuel cell is maintained at a temperature of not less than 65 degrees Celsius and not more than 120 degrees Celsius.

8. A fuel cell comprising:
an electrolyte membrane;
an anode electrode comprising an anode catalyst, an anode catalyst support, and an anode electrolyte; and
a cathode electrode comprising a cathode catalyst, a cathode catalyst support, a cathode electrolyte; wherein:
the electrolyte membrane is interposed between the anode electrode and the cathode electrode,
the anode catalyst is held on the anode catalyst support,
the anode electrolyte covers the anode catalyst and the anode catalyst support,
the cathode catalyst is held on the cathode catalyst support,
the cathode electrolyte covers the cathode catalyst and the cathode catalyst support,
the cathode electrolyte is composed of $SnO_2$, $NH_3$, $H_2O$, and $H_3PO_4$,
the cathode electrolyte is a transparent gel,
a molar ratio X represented by $X=NH_3/SnO_2$ is not less than 0.2 and not more than 5, and
a molar ratio Y represented by $Y=P/Sn$ is not less than 1.6 and not more than 3.

* * * * *